United States Patent Office 3,424,815
Patented Jan. 28, 1969

3,424,815
OLEFIN OLIGOMERIZATION
Lawrence Cannell and Eugene F. Magoon, Berkeley, and John H. Raley, Walnut Creek, Calif., assignors to Shell Oil Company, New York, N.Y., a corporation of Delaware
No Drawing. Filed May 29, 1967, Ser. No. 642,184
U.S. Cl. 260—683.15      12 Claims
Int. Cl. C07c 3/10

ABSTRACT OF THE DISCLOSURE

Olefins are oligomerized to a mixture of principally olefin dimers and trimers in the presence of a homogeneous catalyst prepared from a halide-free organoaluminum compound and a salt of divalent nickel and a halogenated chelating anion.

BACKGROUND OF THE INVENTION

Field of the invention

It is well known that hydrocarbon-soluble complexes of low-valent transition metals are useful in the conversion of low-molecular weight olefins to higher molecular weight products, e.g., dimers, trimers and other lower oligomers as well as high-molecular weight polymeric materials. The type of product observed, e.g., the extent of oligomerization, as well as the stability of the resulting catalyst, is greatly dependent upon the character of the components employed to produce the catalyst complex. In the general method of producing the transition metal complexes which comprises adding to the reaction mixture a hydrocarbon-soluble transition metal salt and a hydrocarbon-soluble aluminum reducing agent, substantial variations in product type, catalyst stability and olefin conversion are encountered when the character of the catalyst complex precursors is varied.

Description of the prior art

One typical class of hydrocarbon-soluble catalyst complexes comprises catalysts produced by contacting a hydrocarbon-soluble nickel compound and an alkyl aluminum halide. The Belgian Patent No. 640,535 issued Nov. 28, 1963, to Shell Internationale Research Maatschappij N.V., describes a process wherein a catalyst produced from hydrocarbon-soluble nickel salts and an alkyl aluminum chloride is employed to dimerize olefins. On the other hand, a similar process utilizing the catalyst of Nowlin et al., U.S. 2,969,408 issued Jan. 24, 1961, which catalyst was produced from a hydrocarbon-soluble triphenylphosphine nickel carbonyl and an alkyl aluminum chloride, resulted in ethylene polymerization.

SUMMARY OF THE INVENTION

It has now been found that an improved process of oligomerizing lower olefins is afforded by employing a homogeneous catalyst composition produced by contacting (a) certain chelates of divalent nickel wherein the chelating anion-ligands are substituted with electron-withdrawing groups and (b) halide-free alkyl aluminum compounds. The homogeneous catalyst is characterized by increased catalytic activity and stability, thereby affording an improved olefin oligomerization process.

DESCRIPTION OF PREFERRED EMBODIMENTS

The olefin reactant

The process is broadly applicable to the oligomerization of monoolefins of two or more carbon atoms. Preferred olefins, however, are straight-chain hydrocarbon monoolefins of from 2 to 10 carbon atoms such as ethylene, propylene, 1-butene, 2-butene, 1-pentene, 2-pentene, 1-hexene, 1-octene and 3-octene. In general, terminal olefins, i.e., α-olefins, are preferred over analogous internal olefins and particularly preferred are the lower α-olefins of from 2 to 5 carbon atoms, i.e., ethylene, propylene, 1-butene and 1-pentene.

The catalyst

The oligomerization catalyst comprises the product of the contacting of (a) certain nickel chelates wherein the chelating ligand-anion is substituted with electron-withdrawing groups, i.e., nitro, halo, cyano or carboalkoxy groups, and (b) halide-free organoaluminum compounds. Although a variety of nickel chelates is operable as the catalyst precursor, superior results are obtained when the nickel chelate is a chelate wherein the chelating ligands are halogenated organic ligands. One class of such chelates incorporates halogenated chelating organo anionic moieties which are representable as β-dicarbonylic compound monoenolates. Chelating ligands of this type are characterized by the presence within the molecular structure thereof of halogen substituents and a moiety represented by the formula

(I)

wherein the nickel is bonded to the monovalent oxygen atom. It must be appreciated that within the nickel chelate structure electron delocalization prevents complete description of the chelate by means of a single structure. One representative formula, however, is the following Formula II

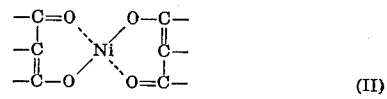
(II)

wherein the dotted lines represent interaction between the unshared electron pairs of the oxygen and the vacant electron orbitals of the nickel.

In terms of the above Formula II the nickel chelate employed to form the oligomerization catalyst is represented by the formula

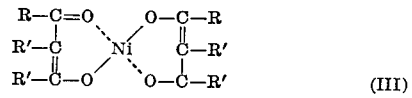
(III)

wherein R and R' independently are hydrogen, alkyl or aryl of up to 10 carbon atoms, or haloalkyl or haloaryl of up to 10 carbon atoms, with the proviso that the two R' groups of each chelating ligand together with the adjacent carbon atoms to which they are attached, may form a six-membered carbocyclic aromatic ring of up to 4 halogen substituents. The halogenated chelating ligand preferably has up to 15 carbon atoms and from 2 to 8 halogen substituents, but more preferably has up to 10 carbon atoms and from 3 to 6 halogen substituents. The halogen substituents of the chelating ligand are suitably fluorine, chlorine, bromine or iodine, but best results are obtained when the halogen substituents are halogen of atomic number from 9 to 17 inclusive, that is, are fluorine or chlorine.

Illustrative of suitable nickel chelates of the above Formula III wherein each R and R' is a monovalent radical are the chelates derived from halogenated β-diketone monoenolates, e.g., bis(1,1,1-trifluoro-2,4-pentandionato)-nickel(II), bis(1,1,1 - trifluoro - 4 - phenyl-2,4-butandionato)nickel(II), bis(1,1,1 - trichloro-2,4-pentandionato)-nickel(II), bis(1,1,1 - trifluoro - 3 - ethyl - 2,4-pentandionato)nickel(II), bis(1,1,5,5 - tetrafluoro - 1,5-diphenyl-2,4 - pentandionato)nickel(II), bis(1,1,1,5,5-pentachloro-2,4 - pentandionato)nickel(II) and bis(1,1,1,5,5,5-hexafluoro - 2,4 - pentandionato)nickel(II). The class of halogenated bis(2,4 - pentandionato)nickel(II) chelates, more commonly referred to as halogenated nickel acetylacetonates is a preferred class of the holgenated β-diketone chelates, and especially preferred are the fluorinated acetylacetonate chelates of nickel.

In an alternate modification, the chelating ligand comprises an aromatic ring compound, i.e., compounds of the above Formula III wherein the R' groups together form a divalent radical in which the monoenol configuration is maintained as a part of the aromatic ring. These chelating ligands are characterized as o-formylphenols or o-alkanoylphenols having halogen substituents on the aromatic ring and/or on an aliphatic side chain. In terms of the phenols whose nickel salts are the catalsyts precursors, illustrative chelating ligands include 3,5-dichlorosalicylaldehyde, o-trichloroacetylphenol, 3,4,5 - trifluorosalicylaldehyde, 3,5-dichloro-2-trichloroacetylphenol and 4 - trifluoromethylsalicylaldehyde. An illustrative nickel chelate of this class is bis(3,5-dichlorosalicylaldehyde)-nickel(II).

The organoaluminum compound employed in production of the oligomerization catalyst comprises an alkyl aluminum hydrocarbyloxide of from 1 to 2 alkyl-aluminum bonds and correspondingly from 2 to 1 hydrocarbyloxide-aluminum bonds. Although alkyl aluminum aryloxides, e.g., alkyl aluminum phenoxides, are suitable organoaluminum catalyst precursors, the preferred class comprises alkyl aluminum alkoxides represented by the formula $$(R'')_m Al(OR'')_n$$

wherein each R'' independently is alkyl of up to 10 carbon atoms, preferably of up to 4 carbon atoms, $m$ is a whole number from 1 to 2 inclusive and $n$ is a whole number from 1 to 2 inclusive selected so that the sum of $m$ and $n$, i.e., the term $(m+n)$, equals 3. The halide-free organoaluminum compounds are therefore alkylaluminum dialkoxides or are dialkylaluminum alkoxides, such as diethylaluminum ethoxide, dipropylaluminum propoxide, ethylaluminum diethoxide, ethylaluminum dibutoxide, butylaluminum dipropoxide, dihexylaluminum ethoxide, and dibutylaluminum butoxide. In general, the dialkylaluminum alkoxides are preferred over the analogous alkylaluminum dialkoxides, and, in part because of the availability thereof, diethylaluminum ethoxide is a particularly preferred catalyst precursor.

The nickel chelate is preferably present in catalytic amounts relative to the olefin to be oligomerized. Amounts of nickel chelate from about 0.0001 mole to about 0.05 mole per mole of olefin are satisfactory. The optimum ratio of nickel chelate to organoaluminum compound will in part depend upon the type of organoaluminum compound employed. It will be understood that a dialkylaluminum alkoxide can be considered as having two moles of alkyl-aluminum bond for each mole of aluminum compound whereas an alkylaluminum dialkoxide supplies only one mole of alkyl-aluminum bond per mole of the aluminum compound. The quantity of the alkyl aluminum alkoxide is selected so that the ratio of moles of alkyl-aluminum bond provided by the aluminum compound to the moles of nickel chelate is from about 0.5:1 to about 6:1, preferably from about 1:1 to about 3:1.

The reaction conditions

The oligomerization process is conducted in the liquid phase in an inert reaction diluent which is liquid at the reaction temperature and pressure. Illustrative of suitable reaction diluents are hydrocarbons free from aliphatic unsaturation such as hexane, heptane, decane, cyclohexane, decahydronaphthalene, benzene, toluene, and xylene, and ethers including diethyl ether, anisole, tetrahydrofuran, dioxane, dimethoxyethane and diethylene glycol dimethyl ether. In certain modifications of the process, for example, as when the olefin to be oligomerized or olefinic oligomer product is liquid under reaction conditions, a portion of the olefin suitably serves as reaction diluent and no added reaction diluent is required. When reaction diluent is utilized, however, amounts up to about 4 moles of diluent per mole of olefin are satisfactory. The process is preferably conducted in an inert reaction environment so that the presence of reactive materials such as water and oxygen is desirably avoided. Suitable reaction conditions are therefore substantially anhydrous and substantially oxygen-free.

The method of conducting the oligomerization process is not critical. In one modification, the olefin reactant, the catalyst components and any diluent which is employed are charged to an autoclave or similar pressure reactor and maintained at reaction conditions for the desired reaction period. It is also useful on occasion to add one reaction mixture component to the others in increments as by adding the olefin to be oligomerized to a solution of the catalyst. In yet another modification, the process is conducted in a continuous manner as by contacting the olefin and catalyst during passage through a reactor which is typically tubular in form. By any modification the oligomerization process is most efficiently conducted at an elevated temperature and pressure. The reaction temperature suitably varies from about 0° C. to about 150° C., depending in part upon the particular olefin to be oligomerized. The temperature range from about 50° C. to about 100° C. is preferred. Suitable reaction pressures are those which serve to maintain the reaction mixture substantially in the liquid phase. Reaction pressures from about 1 atmosphere to about 50 atmospheres in general are satisfactory and good results are frequently obtained by utilizing autogenous pressure, that is, the pressure generated by the reaction mixture when maintained at reaction temperature in a sealed reaction system.

At the conclusion of the reaction the product mixture is separated and the olefin oligomer product is recovered by conventional means such as fractional distillation, selective extraction, adsorption and the like. Unreacted olefin, solvent and/or catalyst components are suitably recycled for additional conversion.

The products of the oligomerization reaction are dimers and trimers of the olefin reactant with amounts of tetramer and heavier product being observed on certain occasions, particularly when ethylene is used as the olefin reactant. In general, selectivity to dimer and trimer increases with the molecular weight of the olefin so that utilization of olefin of 4 or more carbon atoms results in the substantially exclusive production of a dimer and trimer mixture. The product mixture is characterized by a relatively high proportion of linear, unbranched oligomer products although monobranched and dibranched products are also observed. By way of illustration, oligomerization of propylene leads to a mixture of principally dimer ($C_6$) product and trimer ($C_9$) product. The major dimer is n-hexene and the major trimer is n-nonene. Also observed, however, are 2-methylpentene, 2,3-dimethylbutene, methyloctenes and dimethylheptenes as well as some product of higher molecular weight.

The olefin products are materials of established utility and many are chemicals of commerce. The olefins are useful in the formation of thermoplastic polymers or copolymers and are converted by conventional "Oxo" processes to aldehydes of one more carbon atom which are hydrogenated to the corresponding alcohols. The $C_{12}$–$C_{20}$ alcohols thus produced are ethoxylated or sulfated to form conventional detergents and the lower molecular weight alcohols are esterified with polyhydric acids, e.g., phthalic acid, to form plasticizers for polyvinyl chloride and like plastics.

To further illustrate the improved process of the invention, the following examples are provided. It should be understood that the details thereof are not to be regarded as limitations as they may be varied as will be understood by one skilled in this art.

Example.—Comparative propylene oligomerization experiments were conducted employing a nickel chelate wherein the chelating ligand was halogenated and, for comparison, a similar chelating ligand which was not halogenated. In Run A of Table I which follows, approximately 22 g. of propylene in 20 ml. of toluene as reaction solvent was contacted with a catalyst prepared in situ by the addition to the reaction mixture of 1.0 millimole (mmole) of nickel trifluoroacetylacetonate [bis-(1,1,1-trifluoro-2,4-pentandionato)nickel(II)] and 3 mmole of ethylaluminum diethoxide. In Run B of Table I, the reaction mixture was identical except that the nickel chelate was nickel acetylacetonate rather than the fluorinated ligand of Run A, and the reaction time was reduced because of the substantially total loss of catalyst activity by the end of 1 hour. The reaction conditions employed, the selectivity to various oligomers and the percent of straight-chain product is provided in Table I. The product distribution was determined by gas-liquid chromatographic analysis of the olefin product and the percentage of straight-chain product was determined by gas-liquid chromatographic analysis of a hydrogenated product mixture.

cated diluent and contacted with the catalyst components at the indicated reaction temperature for 1.6 hours. The results of this series are listed in Table II.

TABLE II

| Run | 1 | 2 | 3 | 4 | 5 |
|---|---|---|---|---|---|
| Diluent | Toluene | Toluene | Toluene | Toluene | (¹) |
| Nickel chelate, mmole | 1 | 1 | 2 | 1 | 1 |
| $(C_2H_5)_2AlOC_2H_5$, mmole | 0 | 1.5 | 0 | 0 | 0 |
| $C_2H_5Al(OC_2H_5)_2$, mmole | 3 | 0 | 3 | 3 | 3 |
| Reaction temp., °C | 58–65 | 55 | 65 | 65 | 65 |
| Propylene conversion, percent | 80 | 60 | 59 | 9 | 87 |
| Selectivity, percent: | | | | | |
| $C_6$ | 79.8 | 80 | 79 | 71 | 78 |
| $C_9$ | 20 | 19 | 19 | 24 | 19 |
| $C_{12}$ | 0.2 | 1 | 2 | 4.3 | 3 |
| $C_{15}$ | Trace | Trace | Trace | 0.7 | Trace |
| Straight chain product, percent: | | | | | |
| $C_6$ | 72 | 75 | | | 71 |
| $C_9$ | 58 | 58 | | | 55 |
| $C_{12}$ | 42 | 42 | | | 37 |

¹ Tetrahydrofuran.

TABLE I

| Run | A | B |
|---|---|---|
| Reaction temperature, °C | 58–65–58 | 85 |
| Reaction time, hrs | 1.6 | 1 |
| Propylene conversion, percent | 80 | 56 |
| Selectivity, percent: | | |
| $C_6$ | 79.8 | 70 |
| $C_9$ | 20.0 | 24 |
| $C_{12}$ | 0.2 | 6 |
| straight-chain product, percent: | | |
| $C_6$ | 72 | 72 |
| $C_9$ | 54 | 53 |
| $C_{12}$ | 35 | 33 |

Example II.—To a reactor was charged 460 mmoles of 1-pentene, 2 mmoles of the nickel chelate of 3,5-dichlorosalicylaldehyde [bis(3,5-dichlorosalicylaldehydo)nickel (II)] and 6 mmoles of ethylaluminum diethoxide. The mixture was maintained at 75° C. for one hour whereupon the product mixture was separated and analyzed according to the procedure of Example I. The conversion of pentene was 15.4 with a selectivity of 76.2% to dimer ($C_{10}$) product and a selectivity of 23.8% to trimer ($C_{15}$) product. Of the dimer product, 61.9% was n-decene, 37.9% was methylnonene and 0.2% was dimethyloctene.

By a similar procedure, approximately 20 g. of propylene in 20 ml. of toluene as solvent was contacted with 1 mmole of the nickel chelate of 3,5-dichlorosalicylaldehyde and 3 mmoles of ethylaluminum diethoxide, and the resulting mixture was maintained at 85° C. for one hour. The conversion of the propylene was 18% with a 76% selectivity to dimer ($C_6$) product and a 24% selectivity to trimer ($C_9$) product. Of the hexenes produced, 68% was n-hexene.

Example III.—A series of experiments was conducted wherein the nickel catalyst component was the chelate nickel hexafluoroacetylacetonate [bis(1,1,1,5,5,5-hexafluoro-2,4-pentandionato)nickel(II)]. Approximately 22 g. of propylene was dissolved in 20 ml. of the indi- Example IV.—By a procedure similar to that of Example II, 460 mole of 1-pentene was contacted for one hour at 75° C. in an autoclave with 2 mmoles of nickel trifluoroacetylacetonate and various aluminum compounds. The product distribution, determined by the procedure of Example I, and the reaction conditions employed are provided in Table III.

TABLE III

| Run | 1 | 2 |
|---|---|---|
| Aluminum compound, mmoles: | | |
| $C_2H_5Al(OC_2H_5)_2$ | 3 | 0 |
| $(C_2H_5)_2AlOC_2H_5$ | 0 | 1.5 |
| Pentene conversion | 48.5 | 55.5 |
| Selectivity, percent: | | |
| Dimer | 85.4 | 87.0 |
| Trimer | 14.6 | 13.0 |
| Dimer composition, percent: | | |
| n-Decene | 74.6 | 69.9 |
| Methylnonane | 24.8 | 29.6 |
| Dimethyloctene | 0.6 | 0.5 |

Example V.—Runs were made by the procedure of Example II wherein 1-pentene and 2-pentene were contacted with a catalyst prepared from 1 mmole of nickel hexafluoroacetylacetonate and 1.5 moles of diethylaluminum ethoxide. The reaction conditions and the product distribution are provided in Table IV.

TABLE IV

| | Run | | |
|---|---|---|---|
| | 1 | 2 | 3 |
| Feed | 1-pentene | 2-pentene | 1-pentene |
| Reaction temperature, °C | 75 | 75 | 20 |
| Time, hr | 1 | 1 | 1 |
| Pentene conversion, percent | 74.7 | 61.4 | 39.4 |
| Selectivity, percent: | | | |
| Dimer | 76.9 | 85.1 | 92.3 |
| Trimer | 23.1 | 14.9 | 7.7 |
| Dimer composition, percent: | | | |
| b-Decenes | 49.9 | 23.5 | 85.2 |
| Methylnonenes | 49.4 | 75.6 | 14.6 |
| Dimethyloctenes | 0.7 | 0.9 | 0.2 |

Example VI.—By a procedure similar to that of Example I, 10 g. of ethylene in 20 ml. of toluene solvent was contacted with 1 mmole of nickel hexafluoroacetylacetonate and 1.5 mmole of diethylaluminum ethoxide at 60–70° C. for 0.5 hr. The conversion of ethylene was 60% and the product selectivity and percent straight-chain product are provided in Table V.

TABLE V

| | Selectivity, percent | Straight-chain product, percent |
|---|---|---|
| $C_4$ | 31 | 100 |
| $C_6$ | 24 | 80 |
| $C_8$ | 18.6 | 68 |
| $C_{10}$ | 11.5 | 62 |
| $C_{12}$ | 6.8 | 61 |
| $C_{14}$ | 3.7 | 70 |
| $C_{16}$ | 2.6 | 61 |
| $C_{18}$ | 1.8 | |

We claim as our invention:

1. The process of oligomerizing olefins by intimately contacting hydrocarbon monoolefin of from 2 to 10 carbon atoms and a catalyst consisting essentially of the reaction product of (a) a nickel chelate wherein the chelating ligand is a halogenated β-dicarbonylic compound monoenolate and (b) a halide-free alkyl aluminum alkoxide, in the liquid phase at a temperature from about 0° C. to about 150° C.

2. The process of claim 1 wherein the chelating ligand of the nickel chelate is of up to 15 carbon atoms and from 2 to 8 halogen substituents and the alkyl aluminum alkoxide is of the formula $$(R'')_m Al(OR'')_n$$

wherein each R'' independently is alkyl of up to 10 carbon atoms, $m$ is a whole number from 1 to 2 inclusive and $n$ is a whole number from 1 to 2 inclusive selected so that the sum of $m$ and $n$ equals 3.

3. The process of claim 2 wherein the nickel chelate is represented by the formula

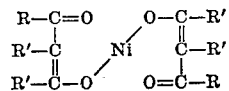

wherein R and R' independently are hydrogen, alkyl of up to 10 carbon atoms, aryl of up to 10 carbon atoms, haloalkyl of up to 10 carbon atoms or haloaryl of up to 10 carbon atoms, with the proviso that the two R' groups of each chelating ligand, together with the adjacent carbon atoms to which they are attached, may form a six-membered carbocyclic aromatic ring of up to 4 halogen substituents of atomic number from 9 to 17 inclusive.

4. The process of claim 3 wherein the olefin is a hydrocarbon monoolefin of from 2 to 5 carbon atoms.

5. The process of claim 4 wherein the nickel chelate is a halogenated nickel acetylacetonate of from 3 to 6 halogen substituents.

6. The process of claim 5 wherein each of said halogen substituents is fluorine.

7. The process of claim 6 wherein the nickel chelate is bis(1,1,1-trifluoro-2,4-pentandionato)nickel(II).

8. The process of claim 6 wherein the nickel chelate is bis(1,1,1,5,5,5 - hexafluoro - 2,4 - pentandionato)nickel (II).

9. The process of claim 4 wherein the nickel chelate is the nickel salt of an o-formylphenol or the nickel salt of an o-alkanoylphenol.

10. The process of claim 9 wherein the nickel chelate is bis(3,5-dichlorosalicylaldehydo)nickel(II).

11. The process of claim 4 wherein the alkyl aluminum alkoxide is a dialkylaluminum alkoxide.

12. The process of claim 11 wherein the dialkylaluminum alkoxide is diethylaluminum ethoxide.

References Cited

UNITED STATES PATENTS

| | | | |
|---|---|---|---|
| 2,969,408 | 1/1961 | Nowlin | 260—683.15 |
| 3,267,076 | 8/1966 | Ishii et al. | 252—431 X |
| 3,271,468 | 9/1966 | Wilke et al. | 260—668 |
| 3,327,015 | 6/1967 | Spitzer | 260—683.15 |
| 3,364,278 | 1/1968 | Reusser | 260—683.15 |

PAUL M. COUGHLAN, *Primary Examiner.*

U.S. Cl. X.R.

260—429; 252—431